United States Patent [19]
D'Amico et al.

[11] 4,260,565
[45] Apr. 7, 1981

[54] PROCESS FOR THE PRODUCTION OF FIBROUS STRUCTURES

[75] Inventors: Fabrizio D'Amico, San Donato Milanese; Giancarlo Serboki, Saronno; Vincenzo Foti, Milan, all of Italy

[73] Assignee: Anic S.p.A., Palermo, Italy

[21] Appl. No.: 914,761

[22] Filed: Jun. 12, 1978

Related U.S. Application Data

[63] Continuation of Ser. No. 686,528, May 14, 1976, abandoned, which is a continuation of Ser. No. 511,080, Oct. 1, 1974, abandoned.

[30] Foreign Application Priority Data

Oct. 2, 1973 [IT] Italy ............................ 29620 A/73

[51] Int. Cl.³ .............................................. B29C 6/00
[52] U.S. Cl. ..................................... 264/13; 264/518; 525/931
[58] Field of Search ................................ 264/12–14, 264/518; 525/222, 240, 931

[56] References Cited

U.S. PATENT DOCUMENTS

| 3,227,794 | 1/1966 | Anderson et al. | 264/13 |
| 3,730,918 | 5/1973 | Teti et al. | 264/13 |
| 3,770,856 | 11/1973 | Ueki et al. | 264/13 |
| 3,808,091 | 4/1974 | Aoki et al. | 264/13 |
| 3,902,957 | 9/1975 | Kozlowski | 264/13 |
| 3,920,508 | 11/1975 | Yonemori | 264/13 |
| 3,995,001 | 11/1976 | Vroomans et al. | 162/157 R |

FOREIGN PATENT DOCUMENTS

| 48-4885 | 2/1973 | Japan | 162/157 R |
| 48-13722 | 4/1973 | Japan | 162/157 R |
| 48-13723 | 4/1973 | Japan | 162/157 R |
| 48-13724 | 4/1973 | Japan | 162/157 R |

Primary Examiner—Jay H. Woo
Attorney, Agent, or Firm—Morgan, Finnegan, Pine, Foley & Lee

[57] ABSTRACT

Polymeric material in the form of fibrids is produced by preparing (1) a homogeneous liquid phase of a first polymeric material and solvent and (2) a second phase of other polymeric material which is incompatible with the first polymeric material and solvent. Phases (1) and (2) are mixed together in such proportions that the quantity by weight of the first polymeric material is greater than that of the second polymeric material in the mixture. The mixture is furnished with sufficient energy to render it flashable and is then subjected to a flash-spinning so that polymeric material in the form of fibrids is produced and those fibrids are thereafter collected.

6 Claims, 1 Drawing Figure

U.S. Patent Apr. 7. 1981 4,260,565

PROCESS FOR THE PRODUCTION OF FIBROUS STRUCTURES

This is a continuation of U.S. patent application Ser. No. 686,528 filed May 14, 1976, now abandoned which in turn is a continuation of U.S. patent application Ser. No. 511,080 filed Oct. 1, 1974 now abandoned.

The present invention relates to a process for the production of fibrous structures starting from polymeric materials.

In the following description of the present invention, we mean by the term "fibrous structure" any known type of fibrous structure such as continuous filaments, short and very short fibers.

By "continuous filament" we mean any fibrous material in which the ratio between length and fiber diameter reaches a very high value; short and very short fibers are the ones in which respectively said ratios reach lower values.

To the class of very short fibers belong the ones known as fibrids which are utilizable, when in the form of plexifilamentous aggregates, for producing paper, for instance.

Processes are known for obtaining such structural types.

It is known in fact that "spinnable" polymers make it possible to obtain filaments by means of the conventional dry-, wet-, melt-spinning methods.

It is known that more or less long filaments can be then converted into fibrids by breaking.

In recent years the production of fibrids has been the subject of exhaustive researches aimed at obtaining substitute products useful for the manufacture of paper.

To this end recently the processes of flash of polymeric solutions have been suggested (see U.S. Pat. No. 3,081,519). This method does not permit the direct production of fibrids for paper and to obtain such a structure it has been proposed to add to the polymeric solution a surface active agent (OS No. 1,951,609).

Methods have been suggested for the polymerization of unsaturated compounds under the action of shearing stresses (OS No. 1,951,576) or for the production, by means of suitable catalysts, of gels adapted to produce fibrids under a breaking action (OS No. 2,117,370).

Another method involves a polymerization cycle and a subsequent flash of the obtained polymer (OS No. 1,958,609).

All these methods present however drawbacks either because the structure is not a fibrid or because, when it is substantially a fibrid, it does not present very good characteristics for the manufacture of paper.

In any case the productivities of such processes are relatively low if one considers the polymeric concentrations which are used.

We have found a simple and economical process which makes it possible to obtain fibrids having very good characteristics with high productivities.

The process of our invention is based on the fact that when a mixture of at least two compounds in different proportions is subjected to a flash, fibrous structures are obtained, said compounds being selected in such a way that they present between themselves either different molecular weights or different structures or different properties so as to be considered, the one in comparison with the other, as presenting a certain incompatibility (such as mixing difficulties in some field or range of temperature and/or pressure and/or concentration).

This is surprising since, to obtain fibrids, the prior art has taught the use of surface active agents (i.e. substances adapted to improve the compatibility between polymer and solvent).

Besides being surprising, since it was unpredictable that incompatible compounds could give products remarkably better than those obtained according to the known art, the process according to the invention makes it possible to obtain a further remarkable advantage since the (incompatible) compound utilized in minor amounts in comparison with the other one enters the final structure of the fibrid and in this way we have a single method for imparting particular properties to the fibrids such as for instance wettability, dyeability, chemical reactivity or (chemical-physical) affinity for other compounds. The process of our invention consists in preparing a substantially homogeneous phase of a polymeric compound (preferably a solution); in adding said substantially homogeneous phase to another substantially homogeneous phase of another (or other) compound (compounds) to some extent incompatible with the first compound; in subjecting the whole to the heating and pressure action necessary to give the energy (thermal and/or mechanical) for carrying out a quick flash (removal of liquid phases from the solid phases); and in collecting the fibrous material so obtained.

The substantially homogeneous phase of the first base compound (or compounds) from which one wants to obtain the fibrous structure, can be conveniently obtained by dissolving the selected compound in one or more organic solvents and/or diluents and use is made for obtaining the highest concentration, also of the effect due to the temperature and pressure.

The second compound (when only a second compound is present) is added in a decidedly lower amount, such as for instance lower than 50% by weight of the base compound, and preferably but unrestrictively in a percentage of from 10% to 20%. The concept of "base compounds" or "other compounds" is relative since the two compounds can exchange their function.

Another interesting feature of the invention is the possibility of using natural polymeric compounds (for instance cellulosic materials) and of adding to them minor amounts of synthetic compounds to obtain final products having determinate and improved properties. The compounds which can be used according to the invention are the polymers convertible into a liquid homogeneous phase by means of organic solvents or diluents and of temperature and pressure and susceptible of undergoing a substantially complete flash. Among the most interesting polymers are: polyethylene, polypropylene, olefinic copolymers, polyvinylacetate, polystyrene polyvinylalcohol, copolymers and so on.

An example of mixture can be one constituted either by a high molecular weight polyethylene and another polyethylene having lower molecular weight (for instance up to products of the wax type) or also a high density polyethylene and a low density polyethylene of equal molecular weight (in this case the difference of structure is exploited).

The mixing types which can impart the functions in the final products which one wants to produce are known to those skilled in the art.

As to the incompatibility and to the method for its quantization see the article "Polymers compatibility" J.

Macromol, Sci, Revs, Macromal. Chem. 7(2) 251-314 (1972).

From a certain point of view use can be made according to the invention of the criteria for the Production of conjugate fibers in a process for the production of fibers by simple flash.

The process according to the invention takes place at temperatures higher than that of the melting point or the softening point or dissolution point and at pressures at least higher than the vapour pressure of the solvent at the flash temperature.

In a preferred embodiment the homogeneous phases are prepared in a first stage under more moderate temperature and pressure conditions and then the mass is subjected to the intensive action of both factors in a second stage and at last to flash and collecting the fibrous material.

BRIEF DESCRIPTION OF THE DRAWING

Our process is illustrated schematically in FIG. 1 wherein 1 represents an autoclave provided with a stirrer, 2 a gear pump, 3 a heat exchanger, 4 a dry collection chamber, 5 a wet collection chamber.

Many variants can be made in the process on the basis of the knowledge of those skilled in the art and the invention comprises also said obvious applications even though they are not specifically mentioned in the present description.

Figure 1:
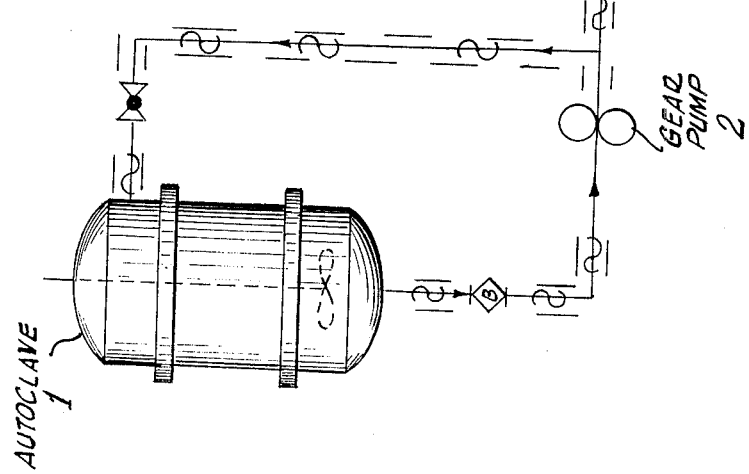

Without limiting the invention we now report the following examples which aim at illustrating the same in a better way.

EXAMPLE 1

An autoclave provided with heating jacket and stirrer was charged with n-heptane and high density polyethylene (MFI=0.5 g/10') so that the polyethylene concentration was 12% by weight with respect to n-heptane.

We heated under stirring up to a temperature of 175° C. corresponding to a vapour pressure of 6.5 kg/cm$^2$ up to a complete homogenization of melted polyethylene and n-heptane.

The solution was fed through a gear pump which raised the pressure from 6.5 kg/cm$^2$ to 30-35 Kg/cm$^2$ to a heat exchanger and discharged through a nozzle of 1 mm diameter and 1 mm thickness.

The solution temperature before expansion was about 195° C.

The obtained product was constituted by a filamentous mass constituted by very thin continuous fibers entangled among them.

EXAMPLE 2

An autoclave provided with heating jacket and stirrer was charged with n-heptane and high density polyethylene.

(MFI=0.5 g/10') so that the concentration of polyethylene in comparison with n-heptane was 12% by weight.

Then a saturated solution at room temperature of polystyrene in toluene was added so that the polystyrene concentration become 10% by weight in comparison with polyethylene (Polystyrene ($\eta$) 25° Toluene=0.36).

The same procedure as that in example 1 was followed and the "solution" was expanded through a nozzle of 1 mm diameter and 1 mm thickness.

The product, morphologically very different from the one described in example 1 was constituted by fibrids or very thin fiber bundles having a length ranging from 1 to 10 mm with an average diameter of about 10 microns. The diameter of the single filaments constituting the bundles could reach also a diameter of about 0.2-0.4 microns.

High density polyethylene fibrids having the same morphological characteristics were obtained by working according to example 1 but lowering the polyethylene concentration in comparison with n-heptane to 5-6% by weight.

EXAMPLE 3

An autoclave provided with a heating jacket and stirrer was charged with n-heptane and high density polyethylene (MFI—2.9 g/10') so that the polyethylene concentration in comparison with n-heptane was 11% by weight. Furthermore low density polyethylene (average molecular 9000) was added so that its concentration was 20% in comparison with high density polyethylene.

We heated under stirring up to a temperature of about 175° C. corresponding to a vapour pressure of 6.5 kg/cm$^2$ so completely homogenizing melted polyethylene and n-heptane. The "solution" was then sent through a gear pump which raised the solution pressure from 6.5 kg/cm$^2$ to 30 kg/cm$^2$ to a heat exanger and discharged through a nozzle having 1 mm diameter and 1 mm thickness. The temperature of the solution before expansion was about 185°-190° C. The obtained fibrids presented sizes and morphologies very similar to the ones described in example 2.

EXAMPLE 4

An autoclave provided with heating jacket and stirrer was charged with n-heptane and high density polyethylene (MFI=2.9 g/10') so that the polyethylene concentration in comparison with n-heptane was 12% by weight.

A solution of polyvinylacetate (Molecular weight 35000) in toluene was then added so that the polyvinylacetate concentration was 70% in comparison with polyethylene.

The whole was heated under stirring up to a temperature of 175° C. the corresponding pressure being 6.5 kg/cm$^2$.

The "solution" pressure was raised by means of gear pump up to 32 kg/cm$^2$ and the temperature was brought to 190° C. by means of heat exchanger.

The "solution" was then discharged through a nozzle having 1 mm diameter and 1 mm thickness.

The obtained fibrids were, in size and morphology, very similar to the ones described in examples 2 and 3.

The fibrids produced according to the method of the present invention can be collected directly as dry fibrids on a belt conveyor or sprayed directly in water and removed from the zone close to the nozzle by means of a pump which may be of the type suitable for cellulose pulp or by means of a screw feeder. In the latter case additives were added to the water, they generally; being surface active agents which allowed the fibrids to be wettable and therefore compatible with water.

For instance a formulation which gave very good results was an acqueous solution containing at least 1% polyvinyl alcohol, at least 1% of carboxymethylcellulose and at least 0.5% of a non ionic surface active agent, for instance ethylene oxide-propylene oxide adduct.

The polyvinyl alcohol used in the previously described formulation presented a saponification grade of about 98% and a viscosity at 20° C. (4% of acqueous solution—Hoppler viscosimeter) of about 20 cP.

As to the incompatibility between high density polyethylene and low molecular weight polyethylene see R-A ISAKSEN, S. NEW MAN AND R. J. CLARK J. APP. POLYM. SCI. VOL. 7/515-531 (1963).

What we claim is:

1. A process for the production of fibrids composed of two incompatible polymer compounds which comprises the steps of:
   (a) dissolving a first fibrid-forming polymer compound selected from the group consisting of, polyethylene, polypropylene, polyvinylacetate, polystyrene, polyvinylalchohol and copolymers thereof in an organic solvent selected from n-heptane and toluene to thereby form a substantially homogeneous liquid phase;
   (b) dissolving a second fibrid-forming polymer compound which is incompatible with said first fibrid-forming polymer compound in an organic solvent selected from n-heptane and toluene to thereby form a substantially homogeneous liquid phase;
   (c) mixing said liquid phases in an amount such that said second fibrid-forming polymer compound is present in said mixture in an amount equal to 10–20% by weight of said first fibrid-forming polymer compound; and
   (d) flash-spinning said mixture at a temperature above the melting point of said fibrid-forming compounds and at a pressure effective to form fibrids.

2. The process of claim 1 wherein said fibrid-forming polymer compounds are selected from high density polyethylene, polystyrene, low density polyethylene, and polyvinylacetate.

3. A process for the production of fibrids composed of high density polyethylene and polystyrene, which comprises the steps of:
   (a) dissolving high density polyethylene in n-heptane to form a first solution;
   (b) dissolving polystyrene in toluene to form a second solution;
   (c) mixing said first and second solutions in an amount such that polystyrene is present in said mixture in an amount equal to 10–20% by weight of the high density polyethylene to thereby form a mixture;
   (d) flash-spinning said mixture at a temperature of above 190° C. and at a pressure of about 30–35 kg/cm$^2$ to form fibrids of high density polyethylene and polystyrene.

4. A process for the production of fibrids composed of high density and low density polyethylene, which comprises the steps of:
   (a) dissolving high density polyethylene in n-heptane to form a solution;
   (b) adding low density polyethylene to said solution, said low density polyethylene being present in an amount equal to 10–20% by weight of the high density polyethylene to thereby form a mixture; and
   (c) flash-spinning said mixture at a temperature of about 185°–190° C. and a pressure of about 30 kg/cm$^2$ to form fibrids of high density and low density polyethylene.

5. A process for the production of fibrids composed of high density polyethylene and polyvinylacetate, which comprises the steps of:
   (a) dissolving high density polyethylene in n-heptane to form a first solution;
   (b) dissolving polyvinylacetate in toluene to form a second solution;
   (c) mixing said first and second solutions in an amount such that polyvinylacetate is present in said mixture in an amount equal to 10–20% by weight of the high density polyethylene to thereby form a mixture; and
   (d) flash-spinning said mixture at a temperature of about 190° C. and a pressure of about 32 kg/cm$^2$ to form fibrids of high density polyethylene and polyvinylacetate.

6. The process of claims 1, 2, 3, 4 or 5 further compromising collecting said fibrids.

* * * * *